April 6, 1965
C. HERZOG
3,176,404
COMBINATION PLUG AND SNAP GAGE
Filed Dec. 19, 1962
2 Sheets-Sheet 1
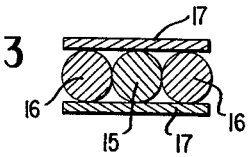
FIG. 3
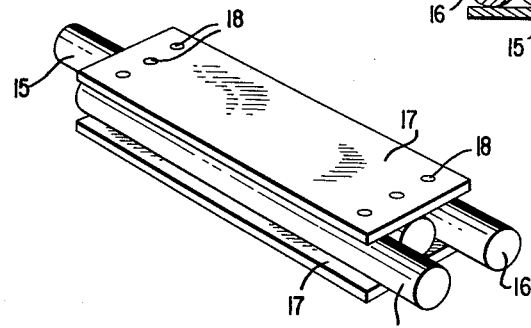
FIG. 1
FIG. 2
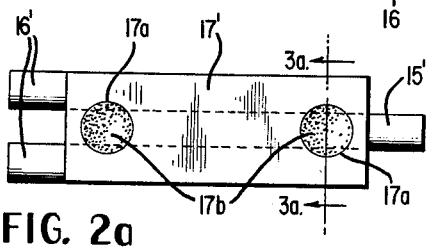
FIG. 2a
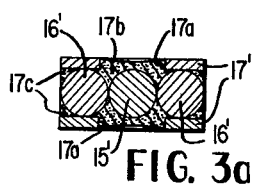
FIG. 3a
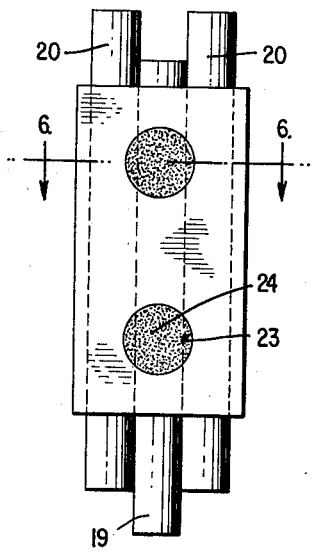
FIG. 5
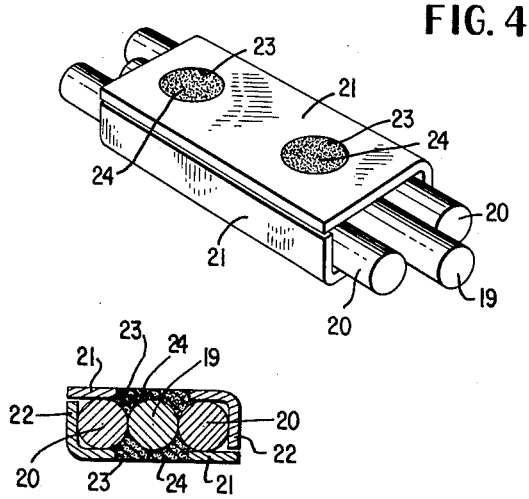
FIG. 4
FIG. 6
INVENTOR.
CARL HERZOG
BY
B. P. Fishburne, Jr.
ATTORNEY April 6, 1965  C. HERZOG  3,176,404
COMBINATION PLUG AND SNAP GAGE
Filed Dec. 19, 1962  2 Sheets-Sheet 2
FIG. 7
FIG. 8
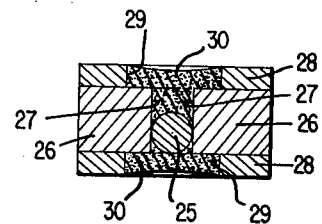
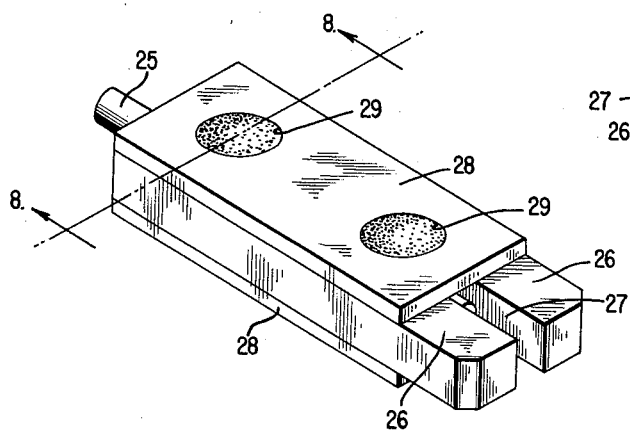
FIG. 10
FIG. 9
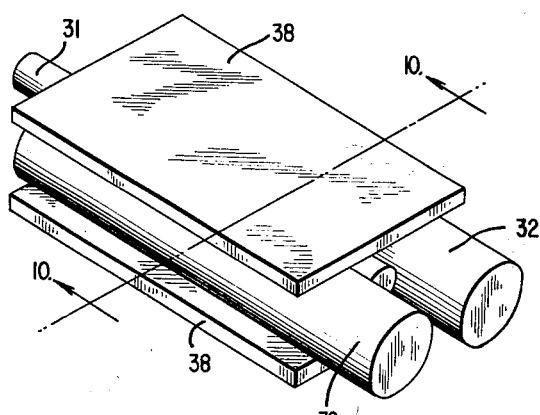
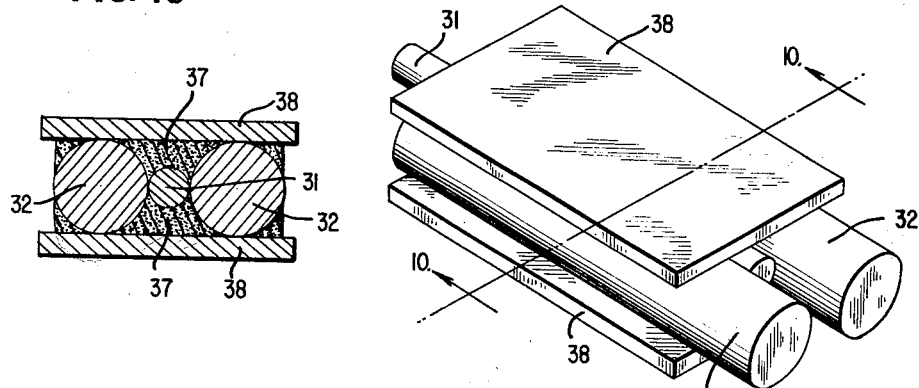
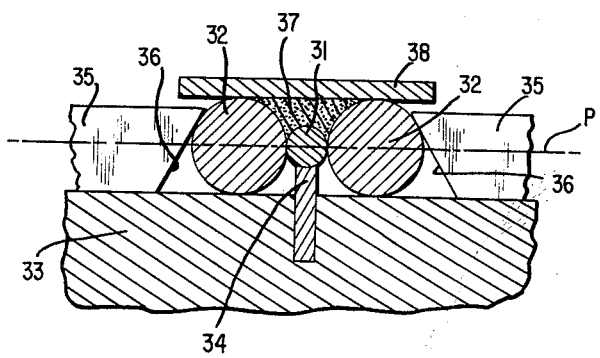
FIG. 11
INVENTOR.
CARL HERZOG
BY
*B. P. Fishburne, Jr.*
ATTORNEY

United States Patent Office 3,176,404
Patented Apr. 6, 1965

3,176,404
COMBINATION PLUG AND SNAP GAGE
Carl Herzog, 11 38th Place, Long Beach, Calif.
Filed Dec. 19, 1962, Ser. No. 245,818
15 Claims. (Cl. 33—168)

This invention relates to improvements in gages employed to check the dimensions of machine parts or other work pieces.

More particularly, the invention relates to combination plug and snap gages of highly simplified and economical construction and suitable to be produced in sets for checking virtually all sizes of work whether large or extremely small. In other words, the gages in accordance with the invention are universal.

Plug gages are commonly mass produced with great accuracy in sets to provide a full range of sizes in increments of .0001 inch. This satisfies virtually all demands for plug gages utilized in industry. However, snap gages are generally custom made and very expensive, and one of the prime objects of this invention is to provide a snap gage structure which may be economically produced in a full range of sizes, for universal application, and in intimate relation with a plug gage component which establishes with great accuracy the dimension or size of the snap gage component of the combination plug and snap gage.

A further object is to provide a combined unitary plug and snap gage which is extremely sturdy and durable and highly compact and embodying a simple mode of assembly which in and of itself establishes the extreme accuracy of the snap gage component in its relationship to a plug gage component of like size.

Another object is to provide a combination gage of the mentioned character whose snap gage portion may have either circular or flat work checking faces as found desirable for various applications.

Still another object is to provide a combination plug and snap gage whose construction is sufficiently rigid throughout a full range of sizes including extremely small sizes, therefore maintaining great accuracy over the entire range.

Other objects and advantages of the invention will be apparent during the course of the following detailed description.

In the accompanying drawings forming a part of this application and in which like numerals are employed to designate like parts throughout the same, FIGURE 1 is a perspective view of a combination plug and snap gage according to one preferred embodiment of the invention, FIGURE 2 is a plan view of the same, FIGURE 3 is a transverse vertical section taken on line 3—3 of FIGURE 2, FIGURE 2a is a plan view on a somewhat reduced scale showing a modified form of the invention, FIGURE 3a is a transverse vertical section taken on line 3a—3a of FIGURE 2a, FIGURE 4 is a perspective view of a gage constructed in accordance with a modification of the invention, FIGURE 5 is a plan view of the same, FIGURE 6 is a transverse vertical section taken on line 6—6 of FIGURE 5, FIGURE 7 is a perspective view of a combination gage constructed in accordance with another modification of the invention, FIGURE 8 is a transverse vertical section taken on line 8—8 of FIGURE 7, FIGURE 9 is a perspective view of a gage according to still another modification, FIGURE 10 is a transverse vertical section taken on line 10—10 of FIGURE 9, and FIGURE 11 is an enlarged transverse cross sectional view showing a fixture employed in assembling the gage of FIGURE 9.

In the drawings, wherein for the purpose of illustration are shown preferred embodiments of the invention, attention is directed first to FIGURES 1–3 showing a combination plug and snap gage according to one form of the invention. In these figures, the plug gage element 15 comprises a cylindrical section of highly accurate gage rod which may have a diameter of any required size over a wide range of diameters in increments of .0001 inch. The gage rod material is available commercially and is manufactured by known methods with an extremely high degree of accuracy and uniformity and the actual making of the gage rod material forms no part of this invention.

The combination gage in accordance with FIGURES 1–3 further comprises a pair of identical snap gage elements or jaws 16, comprising additional sections of the identical cylindrical gage rod material utilized for the plug gage element 15 and each having the same diameter as the element 15. In the embodiment shown, the three gage elements 15 and 16 may be of the same length and they are assembled in side-by-side parallel tangential contacting relation with their longitudinal axes lying in the same plane, FIGURE 3. This assembled relationship of the three gage elements establishes between the snap gage jaws 16 a space or work checking dimension which is exactly equal to the diameter of the intermediate plug gage element 15.

It should be emphasized that in order to produce a combination plug and snap gage or a set of such gages over a full range of sizes to render the gage universal that it is necessary to assemble the three cylindrical gage rod elements of like diameter with their longitudinal axes or centers in a common plane and with the three elements in tangential contacting relation. Only by this arrangement will the snap gage jaws 16 define between them a space equal to the diameter of the plug gage 15. Quite obviously, if the snap gage elements 16 were allowed to lie in another plane offset from the longitudinal axis of the plug gage element 15 while contacting the latter, the space between the jaws 16 would be something less than the diameter of the plug gage element 15 and there would be no fixed relationship between the plug and snap gage components as necessary to provide a useful device for checking an internal work dimension and a like external work dimension.

The elements 15 and 16 are staggered longitudinally in assembly so that the plug gage element 15 will project a suitable distance beyond the corresponding ends of the elements 16 at one end of the assembly. This arrangement also allows the jaws 16 to project in spaced relation beyond the opposite end of the element 15 as shown clearly in FIGURES 1 and 2. While this assembled contacting relationship is maintained between the three coacting gage rods or elements, rectangular flat cover plates 17 are placed in opposed tangential contacting relation with opposite sides of the three element group of gage rods, and preferably with the opposite ends of the cover plates in alignment with the corresponding staggered ends of the elements 15 and 16 as shown. While this relationship is firmly maintained, the cover plates 17 are spot welded as at 18 to the three gage rods 15 and 16 to thereby permanently rigidly secure the structure in accurately assembled relationship and ready for use as a plug gage and as a snap gage of like size. Quite obviously, the construction shown and described in connection with FIGURES 1–3 can be produced in a wide range of gage sizes in increments of .0001 inch as is customary to produce a gage set. The advantage of having both a plug and snap gage of like size integrated in a unitary gage device is obvious to anyone skilled in the art and is not only highly economical and convenient but eliminates entirely the necessity for custom-built snap gages and also the necessity is eliminated for the machinist to purchase and have at hand separate sets of gages for doing the same work which the combination gage may do.

FIGURES 4–6 of the drawings show a modification of the invention which is essentially the same as the above-described embodiment concerning the use of three side-by-side contacting cylindrical plug and snap gage elements 19 and 20 of equal diameter and having their parallel longitudinal axes lying in a common plane and their corresponding ends staggered or offset longitudinally. The difference in construction resides in the means for housing and maintaining the gage rods rigidly assembled. This means in FIGURES 4–6 comprises a pair of opposed substantially L-shaped cover plates or sections 21 disposed in interfitting relation with the gage rods 19 and 20 as depicted in FIGURE 6. The body portions of the plates 21 contact the opposite sides of the grouped gage rods tangentially and the lateral flanges 22 may contact the outer sides of the rods 20 tangentially. The body portions of the plates 21 are provided with through openings 23 on opposite sides of the assembly, and the intervening spaces adjacent these openings on opposite sides of the assembly are filled with epoxy cement masses 24, which masses adhesively bond the gage rods and cover plates securely and rigidly together in permanent assembled relationship. The practicality, high efficiency and economy of utilizing epoxy adhesives for bonding the metal parts effectively is well known to those skilled in the art. The construction shown in FIGURES 4–6 provides a substantially closed housing around the central portion of the combination gage, with the snap gage jaws and the plug gage element fully exposed for convenient use beyond opposite ends of the housing. The degree of longitudinal offset between the snap and plug gage elements 20 and 19 may obviously be varied as found desirable to form a plug gage element of desired axial length and a snap gage space of desired length between snap gage jaws. In this connection, it is not essential that the plug gage element or rod 19 be of identical length with the snap gage rods 20 and this applies to both forms of the invention thus far described. If the three rods are of identical length, the degree of longitudinal offset will establish a plug gage length equal to the longitudinal depth of the snap gage space.

A characteristic of the invention in FIGURES 1 through 6 is that the checking faces of the plug and snap gage components are circular, thus providing a true line contact between the gage elements and the work as distinguished from the more usual flat checking surfaces of conventional snap gages. The disadvantage of flat faced snap gages is that the width of the gage controls the checking area, whereas with the present arrangement, the checking of infinitely small surface areas is rendered possible due to the line contact between the work and the gage elements.

The constructions shown in FIGURES 1 through 6 utilizing cylindrical gage rods of identical diameter possess one limitation regarding the producing of a full range of gage sizes including extremely small sizes such as a snap gage to measure, say, a .060 inch diameter work piece. Using the constructions in FIGURES 1 through 6 for such small gages would necessitate such small diameter snap gage jaws that the same might tend to bend and therefore be inaccurate and the gage in general would be quite weak or fragile. In order to overcome this problem peculiar to small sizes, the modified forms of the invention in FIGURES 7 through 11 have been devised, all falling within the same basic principle of the invention however.

Referring first to FIGURES 7 and 8, a combination plug and snap gage is provided comprising a central cylindrical plug gage element or rod 25, whose diameter as in the prior forms of the invention establishes the size of both the plug gage and snap gage gap. The gage rod 25 is placed between a pair of rectangular plug gage elements or jaws 26 of sturdy and rigid construction so that the latter will have no tendency to bend regardless of the relative smallness of the gage size. The jaws 26 have flat parallel inner faces 27 adapted to engage opposite sides of the cylindrical rod 25 tangentially, FIGURE 8, and this engagement renders the space between the snap gage jaws 26 equal to the diameter of the plug gage element 25 despite the fact that the jaws 26 may be quite heavy for the purpose explained above. The elements 25 and 26 have the same longitudinally offset assembled relation described above so that the working ends of the combination gage will project properly beyond the housing means. Flat cover plates 28 having openings 29 are placed in contact with the opposite sides of rectangular jaws 26, which jaws may, if desired, be considerably thicker than the rod 25 in the direction between plates 28, as depicted in FIGURE 8. Since the jaws 26 are rectangular with the parallel flat faces 27, it is unnecessary that the axis of the cylindrical rod 25 lie in a common plane with the longitudinal axes of rectangular jaws 26, and as shown in FIGURE 8, the rod 25 may lie upon the inner face of one of the plates 28 while contacting the jaws 26 tangentially. While this relationship is maintained, epoxy adhesive 30 is placed within the openings 29 and fills these openings and also the intervening spaces between the flat faces 27 and surrounding the rod 25 adjacent the openings. After curing, the gage assembly is secure and permanent.

The resultant construction is a heavy duty gage which differs from the prior embodiments in that the snap gage jaws 26 are rectangular thus providing flat gaging surfaces with the added advantage of longer wear. While the snap gage produced according to this modification does not afford the previously mentioned line contact with the work to be checked, the construction is ideal for small sizes and for long wear and in small sizes the snap gage component is adequately rigid and therefore accurate in operation.

FIGURES 9 through 11 show another alternative embodiment to meet the problem concerning smaller snap gage sizes without sacrificing rigidity and also preserving line contact with the work through the use of three cylindrical gage elements. In these figures, the cylindrical plug gage element or rod 31 may be small, whereas the outer snap gage jaws or rods 32 may be relatively large in diameter, with each element 32 equal in diameter. When the three parts are in assembled relation as shown, the diameter of plug gage element 31 will define the width of the snap gage gap as in the prior embodiments and the three gage elements are again offset longitudinally. However, it is necessary that the axes of the elements 31 and 32 lie in a common plane P, FIGURE 11, when they are assembled in tangential parallel contacting relation.

FIGURE 11 shows diagrammatically a fixture to facilitate assembling the combination gage of FIGURES 9 and 10. This fixture includes a flat supporting plate 33 upon which the cylindrical jaws 32 are placed with the smaller gage rod 31 between them. An insert 34 within plate 33 establishes the proper height or center line relation of the gage rod 31 relative to the jaws 32 in the assembly operation and the rod 31 rests upon this insert. Movable parallel clamping jaws 35 having beveled faces 36 are provided upon the fixture to hold and centralize the gage elements during the cementing thereof with epoxy adhesive. This adhesive 37 is applied with one cover plate 38 to one side of the assembly and curing is effected while the parts are held within the fixture. The second cover plate 38 and epoxy adhesive may be applied to the opposite side of the assembly without using the fixture and the resutlant construction is shown in FIGURES 9 and 10, and in light of the foregoing descriptions, it is believed that no further discussion is required in connection with the combination gage of FIGURES 9 and 10.

FIGURES 2a and 3a of the drawings show a combination gage substantially identical to the gage depicted in FIGURES 1–3, except that spot welding is not employed to secure the component parts together and instead epoxy adhesive is utilized. In FIGURES 2a and 3a, the numerals 15' and 16' designate the plug and snap gage rods respectively and these elements may be identical to the elements 15 and 16 in FIGURE 1. Cover plates 17' in FIGURES 2a and 3a correspond to cover plates 17 in FIGURE 1, but are provided near their ends with openings 17a for the reception of epoxy adhesive 17b as indicated in FIGURE 3a. This adhesive after hardening firmly bonds the three gage rods and their cover plates together in assembly. As depicted in FIGURE 3a, the epoxy adhesive interlocks the parts rigidly on opposite sides of the assembly adjacent the openings 17a and further application of adhesive along the outer sides of the rods 16' may be made at 17c. The openings 17a are placed quite close to the ends of cover plates 17' to minimize the bending moment on the completed assembly during the use thereof. In all other respects, the gage and its usage are identical to the gage shown in FIGURES 1–3.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A combination plug and snap gage comprising a pair of spaced side-by-side gage rods having corresponding end portions constituting snap gage jaws, an intermediate gage rod between said pair of gage rods and offset longitudinally therefrom and having an end portion defining a plug gage element remote from the snap gage jaws, said intermediate gage rod having opposite sides in direct contact with inner sides of said pair of gage rods and thereby defining the width of the work checking gap between said snap gage jaws, said gap being of the same width as said plug gage element, and rigid interconnecting means for said gage rods locking the same together in an integrated assembly.

2. A gage device comprising three side-by-side longitudinally staggered contacting gage rod elements the outermost pair of which includes end portions constituting snap gage jaws, the intermediate gage rod element including an opposite end portion constituting a plug gage element of a size equal to the width of the gap between said jaws, plate members on opposite sides of said side-by-side gage rod elements and terminating short of said jaws and plug gage element, and means securing said gage rod elements and plate members together in rigid assembled relationship.

3. A combination gage device comprising an outer pair of gage rods having at least the inner sides thereof cylindrically formed on equal radii and including end portions serving as snap gage jaws, an intermediate cylindrical gage rod between said pair in tangential contacting relation with said inner sides and with the longitudinal axes of all of said gage rods in a common plane, one end portion of the intermediate gage rod projecting beyond corresponding ends of said outer pair to form a plug gage element, the diameter of the intermediate gage rod establishing the gage size of the plug gage element and also the gage size between said jaws, and housing means for intermediate portions of said gage rods inwardly of said jaws and plug gage element and secured thereto rigidly.

4. A combined plug and snap gage comprising three equal diameter cylindrical gage rods arranged in side-by-side tangential parallel contacting relation with the longitudinal axes of the gage rods in a common plane, the intermediate gage rod offset longitudinally in one direction from the outermost gage rods, whereby corresponding end portions of the latter constitute snap gage jaws and an end portion of the former constitutes a plug gage element remote from said jaws, the gap between said jaws being equal to the diameter of the plug gage element, and rigid interconnecting means for said three gage rods permanently maintaining said contacting relation thereof.

5. The invention as defined by claim 4, and wherein said interconnecting means is a pair of plates engaging opposite sides of said three gage rods and welded thereto.

6. The invention as defined by claim 4, and wherein said interconnecting means is a pair of plate members engaging opposite sides of said three gage rods and secured thereto with epoxy adhesive.

7. The invention as defined by claim 6, and wherein said plate members having through openings and said epoxy adhesive is within said openings and engaging intervening portions of said three gage rods.

8. A combination plug and snap gage comprising an outer pair of relatively large equal diameter spaced parallel gage rods having end portions constituting snap gage jaws, an intermediate relatively small diameter gage rod between said outer pair in tangential longitudinal contacting relation therewith and in a lateral plane common to the axes of the outer and intermediate gage rods, whereby the diameter of the intermediate gage rod establishes the distance between said jaws, one end portion of the intermediate gage rod extending beyond corresponding ends of said outer pair to form a plug gage element, and means firmly securing all of said gage rods together in assembled relationship.

9. A combination plug and snap gage comprising an intermediate relatively small cylindrical rod having an end portion constituting a plug gage element, an outer pair of relatively large rods on opposite sides of said intermediate rod and having opposed parallel flat faces contacting opposite sides of the intermediate cylindrical rod tangentially and longitudinally, one end of the intermediate rod terminating short of corresponding ends of said outer pair so that end portions of the latter may constitute flat faced snap gage jaws, and means rigidly securing all of said rods together in said contacting relation.

10. The invention as defined by claim 9, and wherein said means includes a pair of plate members on opposite sides of said intermediate and outer rods and contacting the latter.

11. The invention as defined by claim 9, and wherein said means is a pair of apertured plate members on opposite sides of said outer pair of rods and contacting the latter, and epoxy adhesive within said plate apertures and engaging and bonding together said plate members and all of said rods.

12. A method of making a combination plug and snap gage comprising supporting an outer pair of relatively large equal diameter spaced parallel gage rods upon a flat fixture surface, supporting an intermediate relatively small diameter gage rod between said outer pair in longitudinal tangential contacting relation therewith and with the axes of all of said rods in a common plane, engaging the outer sides of said outer pair of gage rods with jaw means to maintain said tangential contacting relation, adhesively securing a side cover plate to said outer pair and intermediate rods while continuing to support all of the rods and while maintaining said jaw engagement, removing the adhesively secured rods and cover plate from the supporting and jaw means, and then adhesively securing a second side cover plate to the opposite sides of the outer and intermediate rods.

13. A combination plug and snap gage comprising a pair of outermost gage rods adapted to serve as snap gage jaws, an intermediate spacer gage rod between said pair and contacting the opposed sides of said pair and adapted to serve as a plug gage element, the size of said contacting spacer gage rod establishing the space between said jaws and rendering such space equal in width to the width of said plug gage element, and means rigidly interconnecting said outermost and intermediate gage rods.

14. A combination plug and snap gage comprising an outer pair of gage rods and an intermediate gage rod all arranged in side-by-side parallel contacting relation in the same plane and all being of equal diameter, the intermediate gage rod being offset longitudinally in one direction from said outer pair, cover plates contacting opposite sides of said gage rods and terminating short of one end of the intermediate gage rod and short of corresponding ends of the outer pair of gage rods, said cover plates having through openings near their opposite ends, and substantially non-shrinking adhesive masses bonding the gage rods to each other and to the cover plates adjacent said through openings and within such openings.

15. The invention as defined by claim 14, and additional adhesive masses bonding said outer pair of gage rods to said cover plates along the outer margins of the cover plates.

References Cited by the Examiner
UNITED STATES PATENTS
2,837,828  6/58  Cybulski _____ 33—168
2,967,161  1/61  Hart _____ 154
3,016,580  1/62  Jaeschke _____ 154

FOREIGN PATENTS
866,851  2/53  Germany.

ISAAC LISANN, *Primary Examiner.*